United States Patent
Makarov et al.

(10) Patent No.: US 12,272,538 B2
(45) Date of Patent: Apr. 8, 2025

(54) SYSTEMS AND METHODS FOR IMAGING AND ABLATING A SAMPLE

(71) Applicants: Thermo Fisher Scientific (Bremen) GmbH, Bremen (DE); Life Technologies Corporation, Carlsbad, CA (US); FEI Deutschland GmbH, Dreieich (DE)

(72) Inventors: Alexander Makarov, Bremen (DE); Michael Ward, Eugene, OR (US); Rainer Daum, Wessling (DE)

(73) Assignees: Thermo Fisher Scientific (Bremen) GmBH, Bremen (DE); Life Technologies Corporation, Carlsbad, CA (US); FEI Deutschland GmbH, Dreieich (DE)

( * ) Notice: Subject to any disclaimer, the term of this patent is extended or adjusted under 35 U.S.C. 154(b) by 210 days.

(21) Appl. No.: 17/755,179

(22) PCT Filed: Nov. 10, 2020

(86) PCT No.: PCT/EP2020/081657
§ 371 (c)(1),
(2) Date: Apr. 22, 2022

(87) PCT Pub. No.: WO2021/104855
PCT Pub. Date: Jun. 3, 2021

(65) Prior Publication Data
US 2022/0399197 A1 Dec. 15, 2022

Related U.S. Application Data

(60) Provisional application No. 62/941,189, filed on Nov. 27, 2019.

(51) Int. Cl.
*H01J 49/04* (2006.01)
*G01N 21/64* (2006.01)
(Continued)

(52) U.S. Cl.
CPC ...... *H01J 49/0418* (2013.01); *G01N 21/6452* (2013.01); *H01J 49/165* (2013.01); *G01N 2001/045* (2013.01)

(58) Field of Classification Search
CPC .. H01J 49/0418; H01J 49/0004; H01J 49/165; H01J 49/0463; G01N 21/6452;
(Continued)

(56) References Cited

U.S. PATENT DOCUMENTS 9,383,260 B1 7/2016 Yoo et al.
10,720,315 B2 7/2020 Taghioskoui
(Continued)

FOREIGN PATENT DOCUMENTS

JP 2003107094 A 4/2003
JP 2011501190 A 1/2011
(Continued)

OTHER PUBLICATIONS

Konig K et al., "Nanoprocessing with nanojoule near-infrared femtosecond laser pulses", Medical Laser Application, Elsevier, NL, vol. 20, No. 3, Oct. 14, 2005 (Oct. 14, 2005), pp. 169-184, XP027821266, ISSN: 1615-1615 [retrieved on Oct. 14, 2005].
(Continued)

*Primary Examiner* — Kiet T Nguyen

(57) ABSTRACT

Disclosed herein are systems for imaging and ablating a sample. An imaging/ablating device (110) includes an optical assembly (112), a sample stage (114), and a receiver (116). The optical assembly (112) is disposed in an inverted position below the sample stage (114) and the receiver (116) is positioned above the sample stage (112). The optical assembly enables imaging of a sample disposed on the sample stage (114). The optical assembly (112) also enables ablation of a region of interest within the sample. The laser light propagated from the optical assembly during ablation
(Continued)

propagates substantially in the same direction as the direction of travel of the ablation plume (20) toward the receiver (116).

22 Claims, 10 Drawing Sheets

(51) Int. Cl.
  *H01J 49/16* (2006.01)
  *G01N 1/04* (2006.01)
(58) Field of Classification Search
  CPC ............ G01N 21/6458; G01N 21/718; G01N 2001/045; G01N 1/04
  USPC ........................................................ 250/288
  See application file for complete search history.

(56) References Cited

U.S. PATENT DOCUMENTS

| | | | |
|---|---|---|---|
| 10,840,077 | B2 | 11/2020 | Taghioskoui |
| 11,219,393 | B2 | 1/2022 | Taghioskoui |
| 11,222,776 | B1 | 1/2022 | Taghioskoui |
| 2009/0162853 | A1 | 6/2009 | Clark et al. |
| 2010/0213367 | A1* | 8/2010 | Miller .................. G01N 1/405 436/175 |
| 2014/0287953 | A1 | 9/2014 | Günther et al. |
| 2015/0187558 | A1 | 7/2015 | Mills et al. |
| 2017/0004959 | A1 | 1/2017 | O'Brien et al. |

FOREIGN PATENT DOCUMENTS

| | | |
|---|---|---|
| JP | 2012510062 A | 4/2012 |
| JP | 2014228431 A | 12/2014 |
| JP | 2016519393 A | 6/2016 |
| JP | 2017512985 A | 5/2017 |
| JP | 2017524913 A | 8/2017 |
| JP | 2018506977 A | 3/2018 |
| JP | 2019500580 A | 1/2019 |
| JP | 2019184612 A | 10/2019 |
| WO | WO-2010068491 A2 | 6/2010 |
| WO | WO-2015128490 A1 | 9/2015 |

OTHER PUBLICATIONS

Olsson M E et al., "Localization of enzymes of artemisinin biosynthesis to the apical cells of glandular secretory trichomes of Artemisia annua L", Phytochemistry, Elsevier, Amsterdam, NL, XP026468020, vol. 70, No. 9, Jun. 2009 (Jun. 2009), pp. 1123-1128.
PCT/EP2020/081657, Search Report and Written Opinion, Feb. 8, 2021, 18 pages.
Thalhammer S et al., "Laser Microtools in Cell Biology and Molecular Medicine", Laser Physics, XP055534619, vol. 13, No. 5, 2003, pp. 681-691.
Zhu Y et al., "Spatially Resolved Proteome Mapping of Laser Capture Microdissected Tissue with Automated Sample Transfer to Nanodroplets", Molecular & Cellular Proteomics, XP055742417, vol. 17, No. 9, Jun. 24, 2018 (Jun. 24, 2018), pp. 1864-1874.
Niehaus M., et al., "Transmission-mode MALDI-2 Mass Spectrometry Imaging of Cells and Tissues at Subcellular Resolution," Nature Methods, Sep. 2019, vol. 16, No. 9, pp. 925-931. (Received: Mar. 20, 2019; Accepted: Jul. 16, 2019;Published online: Aug. 26, 2019).

* cited by examiner

SYSTEMS AND METHODS FOR IMAGING AND ABLATING A SAMPLE

CROSS-REFERENCE TO RELATED APPLICATIONS

The present application is a 35 U.S.C. § 371 National Phase Entry of International Patent Application No. PCT/EP2020/081657, filed on Nov. 10, 2020, which claims priority to U.S. provisional Application No. 62/941,189, filed Nov. 27, 2019, the contents both of which are incorporated herein by reference in their entireties.

BACKGROUND

Technical Field

This disclosure relates generally to systems, devices, and methods for imaging and ablating a sample. In particular, this disclosure relates to systems, devices, and methods for imaging and ablating a biological sample capable of access to sub-cellular detail and capable of transferring an ablated target, without excess degradation of the target, to a receiver to allow for additional downstream analysis.

Related Technology

The "-omics" fields seek to characterize, quantify, or otherwise analyze sets of biological molecules that relate to the structure, function, or dynamics of a target organism or group of organisms. Each -omic field relates to the study of an associated "-ome." The -omics fields include the fields of: genomics, which is the study of the genome; epigenomics, which is the study of the supporting structure of the genome, including DNA binders and chemical modifications of DNA; transcriptomics, which is the study of the set of RNA molecules generated by the target organism(s), including mRNA, miRNA, rRNA, and tRNA; proteomics, which is the study of the complement of proteins generated by the target organism(s); and metabolomics, which is the study of the collection of metabolites generated through cellular processes of the target organism(s).

"Multiomics," (also sometimes referred to as integrative omics) involves the analysis of one or more of such -omes. The goal of multiomics analysis is to gather and/or analyze complex biological data to, for example, discover associations across the various -omes in a way that can better pinpoint markers of disease, allow a better understanding of the partitioning between genotype, phenotype, and environmental effects for a particular condition, and provide greater insight into the ways the various -omes regulate and affect each other.

Several challenges remain, however, to further advancing the field of multiomics. In particular, when moving along the genotype to phenotype path from genome to transcriptome and then to proteome and metabolome, the level of chemical variety and complexity increases exponentially. With that increase in complexity comes associated increased difficulty in obtaining and analyzing the relevant biomolecules.

Further, the relevant regions of interest in which target biomolecules reside are often at the sub-cellular level. It is therefore challenging to obtain the target biomolecules in a way that allows effective downstream analysis of the biomolecules. However, conventional methods such as laser ablation electrospray ionization (LAESI), including picosecond infrared LAESI (PIR LAESI), do not allow for collection of biomolecules at the sub-cellular level. In LAESI, laser-ablated material are ionized by nanometer-sized droplets from an electrospray ion source which are then transmitted to a mass spectrometer for analysis. Conventional LAESI systems, however, have inherent spatial constraints that lead to low numerical aperture (NA) optics. The low NA optics used for ablation of the sample lead to large ablation spot sizes. Minimum spot sizes, for example, are typically much larger than whole living cells, and are simply not small enough to allow for the targeted ablation of sub-cellular regions of interest.

Direct access to intra-cellular and/or inter-cellular biological material of living cells is also key to effectively analyzing the biochemical aspects of such cells under real time conditions. However, conventional methods of obtaining targeted cellular material for further downstream analysis typically rely on fixing, and often drying, a sample. For example, matrix-assisted laser desorption/ionization time-of-flight (MALDI TOF) uses a matrix for ionization of molecular components. The requirement to fix the sample makes MALDI TOF incompatible with monitoring of live cells.

There is therefore an ongoing need for systems, devices, and methods capable of obtaining cellular material from living cells at the sub-cellular level in a manner that allows for effective downstream analysis of the obtained material.

SUMMARY

Embodiments described herein enable the collection of targeted biological material from a sample in a manner that that does not excessively degrade the biological material and allows for effective downstream analysis of the obtained material. In certain embodiments, the sample may include live cells, and the targeted biological material may be obtained under normal ambient conditions (e.g., without pressure control, humidity control, etc.). In certain embodiments, a targeted region of interest of the sample may have a sub-cellular size. In certain embodiments, the targeted biological material may be removed from a cell with minimal impact on the remaining cellular structure in a manner that may even allow the cell to survive to be optionally used for further testing.

In one embodiment, a device for imaging and ablating a sample includes a sample stage having a first side (e.g., an upper side) configured for placement of a sample thereon and a second side (e.g., a lower side) disposed opposite the first side. The device also includes an optical assembly with an objective and a laser. The objective is disposed on the second side of the sample stage and is configured to enable microscopic imaging of the sample placed on the sample stage. The laser is disposed on the second side of the sample stage and is configured to direct laser light through the sample stage and into the sample to selectively ablate at least a portion of the sample, such as a targeted region of interest of the sample. The device also includes a receiver disposed on the first side of the sample stage. The receiver is configured to receive ablated material ejected from the sample to enable further analysis of the ablated material.

In one embodiment, the laser and objective are configured such that the laser light is directed through the objective and is oriented so that the laser light substantially propagates in the intended direction of movement of an ablation plume resulting from ablation of the sample. This beneficially allows the expanding ablation plume to effectively travel toward the receiver along a line substantially parallel to the direction of propagating laser light rather than against it.

The optical assembly may be configured to enable brightfield imaging, sectioning (e.g., via confocal microscopy), epifluorescence imaging, two-photon imaging, or combinations thereof. The objective may have a numerical aperture (NA) of about 0.5 or more, or about 0.65 or more, or about 0.75 or more, or about 0.8 or more.

The laser is preferably a femtosecond, infrared laser. The laser and other optical assembly components may be configured to deliver pulse energies of about 1 nJ to about 10 µJ per µm' of sample. A targeted region of interest to be ablated may have a "spot size" diameter of about 50 µm or less, or about 30 µm or less, or about 10 µm or less, or about 5 µm or less, or about 3 µm or less, or about 1.5 µm or less, or about 1 µm or less. In volumetric terms, the targeted region of interest to be ablated may have a volume of about 500 $\mu m^3$ or less, about 250 $\mu m^3$ or less, about 100 $\mu m^3$ or less, about 50 $\mu m^3$ or less, about 25 $\mu m^3$ or less, about 10 $\mu m^3$ or less, about 5 $\mu m^3$ or less, or about 2 $\mu m^3$ or less. The optical assembly may therefore be utilized to ablate multiple whole cells, single whole cells, or sub-cellular volumes, such as targeted organelles or other intracellular structures, or extracellular volumes outside of cells.

In one embodiment, the receiver includes a medium configured for non-overlapping, spatial differentiation of individual subsamples of ablated material, such as a microwell plate or chip. In one embodiment, the receiver includes a nanodroplet array. In one embodiment, the receiver includes an electrospray probe configured to collect ablated subsamples and transmit them to an inlet of a mass spectrometer in the form of ionized droplets. The electrospray probe may be associated with a capillary that provides a solvent for wetting an outer surface of the electrospray probe.

In one embodiment, a system for ablating and analyzing a targeted region of a sample includes an imaging and ablating device and an analyzer configured to receive and analyze at least a portion of the ablated material received by the receiver. The analyzer may include, for example, one or more PCR machines, sequencing machines, optical spectrometers, nuclear magnetic resonance (NMR) spectrometers, mass spectrometers, chromatography devices, centrifuges, electrophoresis devices, radiolabeling and radiolabel detection devices, other analytical biochemistry devices, or combinations thereof. The system may further include an upstream processor, such as an electrical droplet sorter, sorting centrifuge, or the like, configured for sorting or otherwise processing of a sample prior to positioning of the sample on the sample stage.

In one embodiment, a method of imaging and ablating sample to enable analysis of an ablated portion of the sample includes the steps of providing an imaging and ablating device, acquiring an image of the sample, selecting a region of interest within the sample, delivering laser light to the region of interest to ablate at least a portion of the region of interest. And capturing at least a portion of the ablated material on the receiver.

In one embodiment, the ablation is carried out in ambient atmosphere. In one embodiment, the sample includes live cells. In one embodiment, the ablated subsample is removed from a targeted cell without killing the targeted cell.

In one embodiment, multiple laser pulses are applied to the sample. Multiple ablated subsamples may be formed from multiple ablation events and may be collected at the receiver in non-overlapping, spatially distinguished positions. One or more of laser pulse frequency, laser pulse energy level, or laser pulse depth may be dynamically varied across the multiple laser pulses. For example, in one operational mode, laser pulse intensity is set an initial high level to remove material in the sample overlying the region of interest, and is then set to a lower level for ablation of the at least a portion of the region of interest.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Introduction

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

Figure 1:
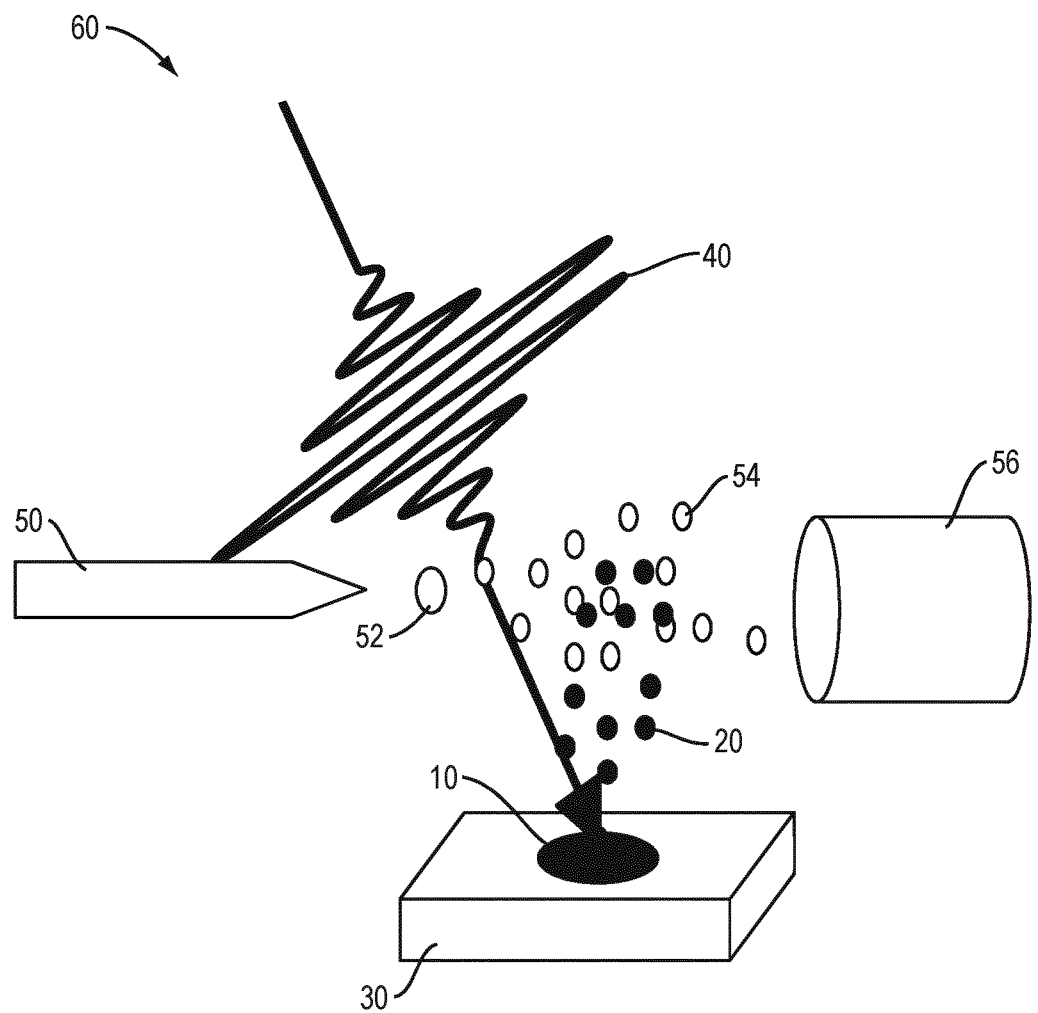
FIG. 1 illustrates a conventional laser assisted electrospray ionization (LAESI) system.

FIG. 1 illustrates a conventional LAESI system 60. As shown, laser light 40 is directed to a sample 10 disposed on a sample slide 30. The laser light 40 is tuned to cause ablation of a portion of the sample 10, resulting in an ablation plume 20 that propagates upward in a direction opposite the direction of laser light propagation. An electrospray needle 50 is disposed above the sample slide 30 at a height between the sample slide 30 and the optics through which the laser light 40 is passed. The electrospray needle 50 emits electrospray droplets 52 across the path of the ablation plume 20. Some of these droplets 52 will interact with droplets of the ablation plume 20 to form ionized sample droplets 54. A mass spectrometer inlet 56 is typically aligned with the electrospray needle 50 and positioned to receive some of the ionized sample droplets 54 for analysis.

While conventional LAESI systems such as system 60 enable the collection and analysis of ablated portions of a sample 10, several limitations exist. In particular, inherent spatial constraints severely limit the resolution at which the laser light 40 may be applied to the sample 10, meaning that spot sizes are relatively large, typically much larger than whole cells. In order for the stream of electrospray droplets 52 to cross the ablation plume 20, the electrospray needle 50 and the mass spectrometer inlet 56 must be positioned between the sample slide 30 and the optical assembly through which the laser light 40 is propagated. This limits the focus potential of the system and leaves the optics with less than desirable NA. In addition to the spatial constraints, it may also require the optics to focus through the stream of electrospray droplets 52 to focus on the sample 10.

Another disadvantage of such a conventional LAESI system 60 is that the direction of propagation of the laser light 40 (i.e., the k vector of the laser light) runs against the direction the ablation plume 20 must travel in order to reach the crossing path of electrospray droplets 52. This reduces the efficiency of transporting the ablated material to the mass spectrometer inlet 56. In addition, the spatial positioning of the components means that debris from the ablation plume 20 can dirty the optics and other overlying components, further degrading performance of the system and increasing operational costs for cleaning and/or part replacement.

Imaging and Ablation System Overview

Figure 2:
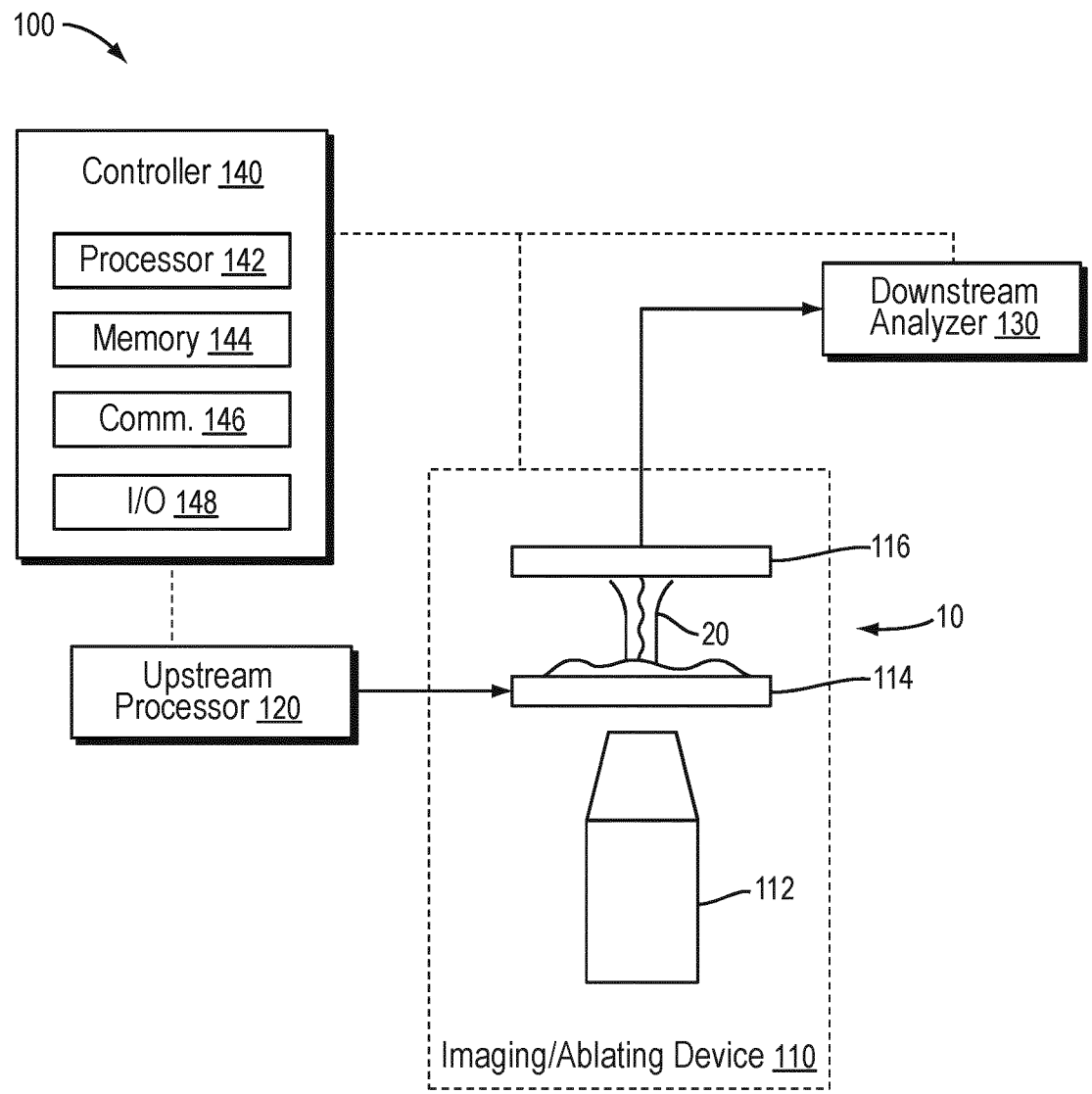
FIG. 2 illustrates a schematic overview of a system for imaging and ablation of a sample that provides one or more benefits over conventional imaging and ablation systems, the system including an imaging/ablating device with an optical assembly, sample stage, and receiver.

FIG. 2 illustrates a schematic overview of a system 100 for imaging and ablation of a sample. The illustrated system 100 may improve upon one or more of the limitations of the conventional LAESI system 60 as described above. The system 100 includes an imaging/ablating device 110. The imaging/ablating device 110 includes an optical assembly 112, a sample stage 114, and a receiver 116. As shown, the optical assembly 112 is disposed in an inverted position below the sample stage 114 such that light propagates upward through the optical assembly 112 and into the sample stage 114.

In operation, light form imaging and/or ablation passes through the optical assembly 112, then through the sample stage 114 and into a sample 10 positioned on the sample stage 114 (e.g., on a sample slide which is itself positioned on the sample stage 114). The same optical assembly 112 may be used for both imaging of the sample 10 and for ablation of a targeted region of interest within the sample 10. During ablation, a region of interest within the sample 10 is targeted, and laser light is directed through the optical assembly 112 and into the region of interest. The directed laser light may be tuned to cause the region of interest to ablate and form an ablation plume 20 that extends away from the sample stage 114 toward the receiver 116. The receiver 116 is positioned above the sample stage 114 such that at least a portion of the extending ablation plume 20 may be captured at the receiver 116. The sample stage 114, the receiver 116, or both may include positioning systems that allow them to be selectively moved in at least two axial directions, preferably in all three axial directions.

In contrast to the conventional LAESI system 60, the illustrated imaging/ablating device 110 provides the optical assembly 112 in an inverted position. This beneficially provides greater freedom in positioning the optical assembly 112 relative to the sample stage 114, allowing for the use of higher NA optics. The higher NA optics, in turn, enable focusing on smaller regions of interest and smaller ablation spot sizes. As explained in more detail below, some embodiments may enable ablation spot sizes at the sub-cellular level.

The illustrated imaging/ablating device 110 is also configured to direct laser light into the direction of ablation plume 20 extension. In the illustrated imaging/ablating device 110, the ablation plume 20 is intended to extend in the same direction as the propagating laser light, rather than against it as in the conventional LAESI system 60. The illustrated imaging/ablating device 110 is therefore able to provide effective transfer of ablated sample material to the receiver 116 without requiring the ablation plume 20 to travel against the direction of propagating laser light.

In addition, the configuration of the illustrated imaging/ablating device 110 removes the optical assembly 112 from the path of the extending ablation plume 20. This beneficially limits optical degradation and/or component damage resulting from ablated debris contacting or collecting on the optical assembly 112.

The receiver 116 may be configured to spatially and/or temporally differentiate the received individual subsamples of ablated material (i.e., the material corresponding respectively to each ablation event). In some embodiments, the receiver 116 includes a medium configured for spatial differentiation of the individual subsamples, such as a microwell plate or a nanodroplet array. Such media allow for subsequent analysis of the collected and spatially differentiated subsamples, such as PCR of nucleic acid within the ablated materials or sequencing of nucleic acid within the ablated materials.

The receiver 116 may additionally or alternatively include an electrospray probe. The electrospray probe may be utilized to generate ionized sample droplets for transmission to a mass spectrometer inlet. The receiver 116 may also be configured as a solvent-wetted surface. The solvent may have a flow rate such that received ablated subsamples are spatially differentiated based temporally on when they were ablated and received.

In some embodiments, the electrospray probe and the wetted surface are combined. For example, as explained in more detail below, the electrospray probe may be partially disposed within a capillary, with an exposed distal portion that extends out of the capillary and terminates at a tip. The exposed distal portion is positioned to receive the ablated subsamples from the sample stage (i.e., is positioned above the sample stage). The capillary is configured to apply the solvent to an outer surface of the electrospray probe such that the solvent flows along an outer surface of the exposed distal portion toward the tip of the electrospray probe. In this manner, as ablated subsamples are captured by the exposed distal portion, they then flow toward the tip of the probe where they are ionized and transmitted toward a mass spectrometry inlet.

The receiver 116, and in particular the portion of the receiver that initially contacts and receives the ablation plume 20, may be spaced from the upper surface of the sample stage by a distance of about 1 mm or less, or by about 500 μm or less, or by about 350 μm or less, or about 250 μm or less, or about 200 μm or less, or by about 150 μm or less. Dimensions within the foregoing ranges have been found to provide effective collection of ablated material by the receiver.

The distance between the sample and the portion of the receiver 116 that initially receives the ablation plume 20 may also be tailored to provide effective transfer of the ablated material to the receiver 116. Ablated materials will displace from the sample with kinetic energy (quadratic with velocity), but will experience a drag force (quadratic with velocity) that decelerates the materials and removes the kinetic energy. All kinetic energy will be removed over a distance L of about:

$$L = \left(\frac{h}{C}\right)\left(\frac{\rho s}{\rho g}\right)$$

where h is the thickness/height of the ablated portion of the sample, ρs is the sample density, μg is the gas density, and C is the drag coefficient (usually about 1). Typically, L works out to be approximately 700 h. The distance between the upper surface of the sample and the receiver is therefore preferably less than L, or in other words, is preferably less than about 700 times the height of the ablated portion of the sample.

In some embodiments, the imaging/ablating device 110 includes an incubation container (not shown) configured in size and shape to be disposed between the sample stage 114 and the receiver 116 and configured to provide an incubation environment for the sample 10 placed upon the sample stage 114.

The illustrated system 100 may also include an upstream processor 120 configured to sort, spatially orient, and/or otherwise process a sample prior to positioning of the sample on the sample stage 114. For example, the upstream processor 120 may include a sorting device such as an electrical droplet sorter for sorting cells or other sample components onto a sample slide, the sample slide being configured for subsequent placement upon the sample stage 114. The upstream processor 120 may additionally or alternatively include a centrifuge, such as a Cytospin™ centrifuge. The centrifuge may be configured, for example, to spin a cell suspension onto a slide, with the slide being configured for subsequent placement upon the sample stage 114. Other upstream processing components as known in the art for sorting and positioning samples and/or cells may additionally or alternatively be included in the upstream processor 120.

Figure 3:
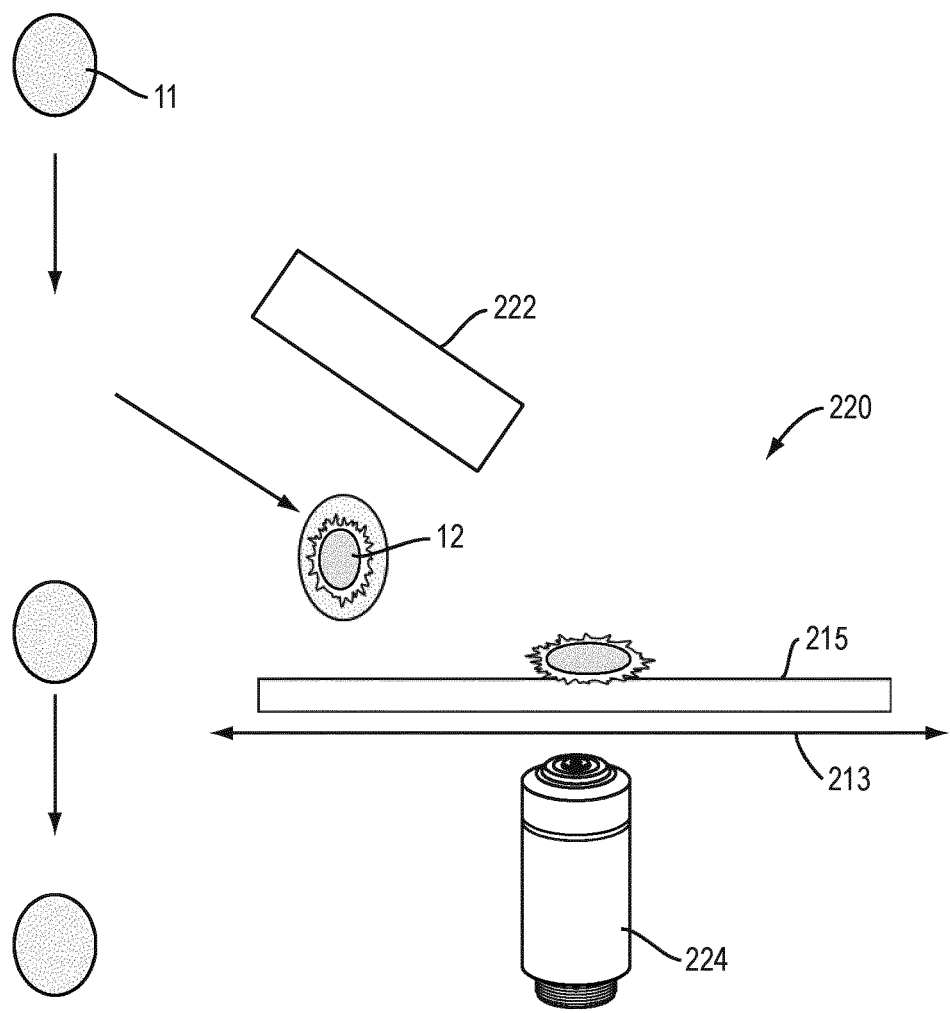
FIG. 3 illustrates an exemplary upstream processor in the form of an upstream electrical droplet sorter.

One example of an upstream processor is an electrical droplet sorter 220 as illustrated in FIG. 3. A series of droplets 11 may be passed near a deflector 222 (e.g., one or more electrodes), which operates to selectively deflect droplets of interest, such as those containing cells 12. The cells 12 may be directed to an imaging slide 215 positioned on a responsive stage 213. The responsive stage 213 may sequentially move to provide space on the slide 215 as additional droplets are sorted onto the slide 215. The slide 215 may have reference marks allowing the spatial position of the individual sorted droplets to be referenced. A camera 224 allows the positions of the individual sorted droplets to be recorded, which may also be correlated to droplet flow data (e.g., timing data indicating when each individual sorted droplet was sorted from the flow of droplets).

After a desired number of droplets have been sorted onto the slide 215, the slide 215 may be transferred to the sample stage 114 such as illustrated in FIG. 2. The positions of the individual sorted droplets on the slide 215, as recorded by the camera 224, may be correlated to images obtained using the imaging/ablation device 110. Thus, ablated subsamples may be traced back to images obtained using the imaging/ablation device 110, then back to spatial position on the slide 215, and ultimately back to the droplet flow data.

Additional or alternative upstream processing operations may include fixing cells to a slide. As explained above, however, the systems, devices, and methods described herein are able to perform imaging and ablation of live cells under ambient conditions, and thus fixing cells is not a necessary pre-processing step. Other additional or alternative upstream processing operations may include staining the sample, and/or adding a label to the sample.

Referring again to FIG. 2, the illustrated system 100 may also include a downstream analyzer 130 configured to receive ablated sample from the receiver 116 for further analysis. The downstream analyzer 130 may include, for example, a PCR machine, a sequencing machine, an optical spectrometer, a mass spectrometer, or combinations thereof. Other biomolecule analysis devices as known in the art may additionally or alternatively be included. Where a mass spectrometer is included, the analyzer 130 may include one or more of, for example, a time of flight (TOF) mass spectrometer, an orbitrap mass spectrometer, a linear ion trap mass spectrometer, a quadrupole mass spectrometer, a quadrupole ion trap mass spectrometer, a magnetic sector mass spectrometer, or a Fourier transform ion cyclotron resonance (FTICR) mass spectrometer.

The illustrated system 100 may also include a controller 140 communicatively coupled to one or more of the other components of the system to provide control and/or feedback of the system 100. The controller 140 includes one or more processors 142, memory 144 (e.g., on one or more hardware storage devices), and a communications module 146 for controlling the sending and receiving of data between the controller and the various components of the system 100 to which the controller 140 is coupled. The controller 140 may also include input/output hardware 148 as known in the art for receiving input from a user and/or for displaying information to a user.

Additional details and embodiments related to the system 100 are described below. It will be understood that the embodiments described below may be provided in any combination and utilized in conjunction with the overall system 100 as described above. In the embodiments described below, like numbers may be used to refer to like components.

Optical Assembly

Figure 4:
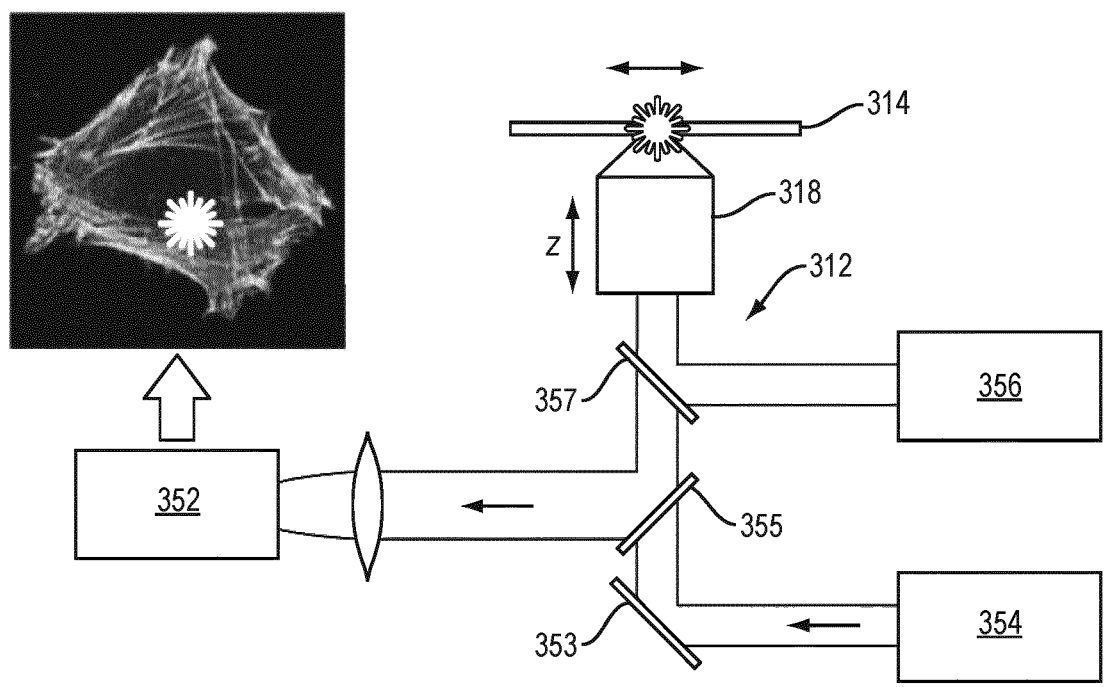
FIG. 4 illustrates an example of an optical assembly that may be utilized in an imaging/ablating device as described herein.

FIG. 4 schematically illustrates one example of an optical assembly 312 that may be utilized in an imaging and ablating system such as system 100 described above. In some embodiments, the optical assembly 312 is configured to provide for epifluorescence imaging. The optical assembly 312 may include an objective 318 that preferably has an NA of about 0.5 or more, or about 0.65 or more, or about 0.75 or more, or about 0.8 or more. The optical assembly 312 also includes an imaging light source 356, an ablation light source 354 (i.e., laser source 354), and a camera 352 (e.g., a charge-coupled device (CCD) camera).

The optical assembly 312 may also include one or more dichroic beamsplitters/mirrors, such as dichroics 355 and 357. Dichroic 357, for example, is configured to reflect excitation light, or a portion thereof, from the imaging light source 356 toward the objective 318, and to allow passage of emission light emitted back to the objective 318 by the sample. The emitted light may then be reflected by dichroic 355 toward the camera 352. One or more filters may also be positioned along the optical path in order to filter/block source light and/or reflected excitation light as desired for particular application needs. For example, one or more excitation filters may be utilized to suppress unwanted background from the excitation light source, one or more emission filters may be utilized to suppress unwanted fluorescence background emanating from the sample, and/or other known filter elements as desired. The dichroic 355 may also function to allow passage of ablation light from the ablation light source 354 toward the objective 318. One or more mirrors/filters 353 may also be included for manipulating the laser light along the optical path between the source 354 and the objective 318.

The imaging light source 356 may include a xenon arc lamp, mercury-vapor lamp, or LEDs, for example. The ablation light source 354 preferably includes an infrared laser (e.g., near infrared or "NIR"). The laser is also preferably a femtosecond laser. The laser may also be configured to enable two photon imaging using the objective 318. The ablation light source 354 may be used in addition to or as an alternative to the light source 356 for imaging purposes as well as for ablation. For example, as described below, an NIR source may be utilized at low pulse energies to obtain imaging information and at high pulse energies for ablation.

The use of NIR from the ablation light source 354 may be particularly advantageous for the intended ablation operations, in particular as compared to the use of ultraviolet (UV) light. For example, meaningful interaction of ablation light with a targeted biological sample is limited by the scattering of light at the structures of the biological material (e.g., changes of refractive index at membranes, nuclei, vesicles, etc.). This causes a loss of information and can make it difficult to focus targeted information on a detector in a meaningful manner. The applied ablation light will also be affected by phase shift and loss on the biological structures, and by absorption of light by the biological structures. Because these limitations are primarily a function of wavelength of the applied light, the limitations are more relaxed when NIR light is utilized. Configuring the ablation light source 354 as an NIR source therefore has better resolution and sample penetration depth as compared to UV applications (such as UV MALDI applications).

Moreover, to achieve super resolution better than about 20 nm via localization, one is limited to a penetration depth of about 1 µm of the thickness of a typical fixated biological sample. For a standard visible (VIS) range resolution or about 250 nm, the penetration depth is about 10 to 20 µm maximum. In the case of NIR, the penetration depth is much higher for two photon excitation, such as up to about 100 µm. The use of NIR thus beneficially allows for deeper penetration into the target sample tissue, and enables the ablation even of relatively complicated tissues (e.g., brain). The enhanced depth penetration and resolution also increases the chances that remaining material survives and/or retains structural information following laser manipulation. Further, whereas imaging of thicker samples is not feasible in the VIS range, two photon imaging using low NIR pulse energies beneficially allows imaging at greater depths and therefore allows for better volume information.

Although the exemplary optical system 312 is illustrated herein, it will be understood that other optical components for imaging and/or ablation, including other dichroics, filters, mirrors, light sources, cameras, and/or other optical components as are known in the art, may be additionally or alternatively included to provide other imaging modalities. The optical assembly 312 may also be configured, for example, to enable brightfield imaging and/or sectioning (e.g., using confocal imaging components). Optical assemblies described herein may be configured to provide independent focus control for each of imaging and ablation. That is, one or more adaptive optics assemblies may be included to provide, for example, dynamic control of ablation spot size within a given imaging field of view.

When used for ablation of a region of interest, the laser may be configured to deliver pulse energies of about 1 nJ up to about 20 µJ for a given 1 µm×1 µm×2 µm voxel. Larger regions of interest are capable of absorbing more energy and are therefore able to withstand larger absolute pule energies. In other words, the laser may be configured to deliver pulse energies of about 0.5 nJ to about 10 µJ per $µm^3$.

The 10 µJ per $µm^3$ upper limit represents an upper limit before fragmentation and ionization is expected to excessively occur, and thus represents the upper limit where preservation of the ablated region of interest is desired. As explained in more detail below, however, in some implementations it may be desired to fragment/ionize a targeted region by delivering one or more pulses above the 10 µJ per $µm^3$ upper limit. Briefly, for example, it may be desirable to focus the laser on a volume of media above a region of interest within a cell and to blow off the overlying media prior to then ablating the region of interest within the cell. This process could provide greater clearance for the ablated region of interest to travel from the sample stage to the receiver (see related discussion corresponding to FIG. 11).

As mentioned above, the imaging/ablating devices described herein are beneficially capable of targeting relatively small regions of interest. The optical assembly may be configured to provide a spot size diameter of a targeted region of about 50 µm or less, or about 30 µm or less, or about 10 µm or less, or about 5 µm or less, or about 3 µm or less, or about 1.5 µm or less, or about 1 µm or less, for example. In terms of volume, the optical assembly may be configured to ablate a targeted region of about 500 $µm^3$ or less, about 250 $µm^3$ or less, about 100 $µm^3$ or less, about 50 $µm^3$ or less, about 25 $µm^3$ or less, about 10 $µm^3$ or less, about 5 $µm^3$ or less, or about 2 $µm^3$ or less.

In some implementations, the optical assembly may be configured to ablate a whole cell or a collection of multiple cells. In other implementations, the optical assembly may be configured for ablating targeted regions of sub-cellular size, such as particular organelles or other intracellular regions, or particular extracellular regions.

Ablated Sample Receiver

Figure 5:
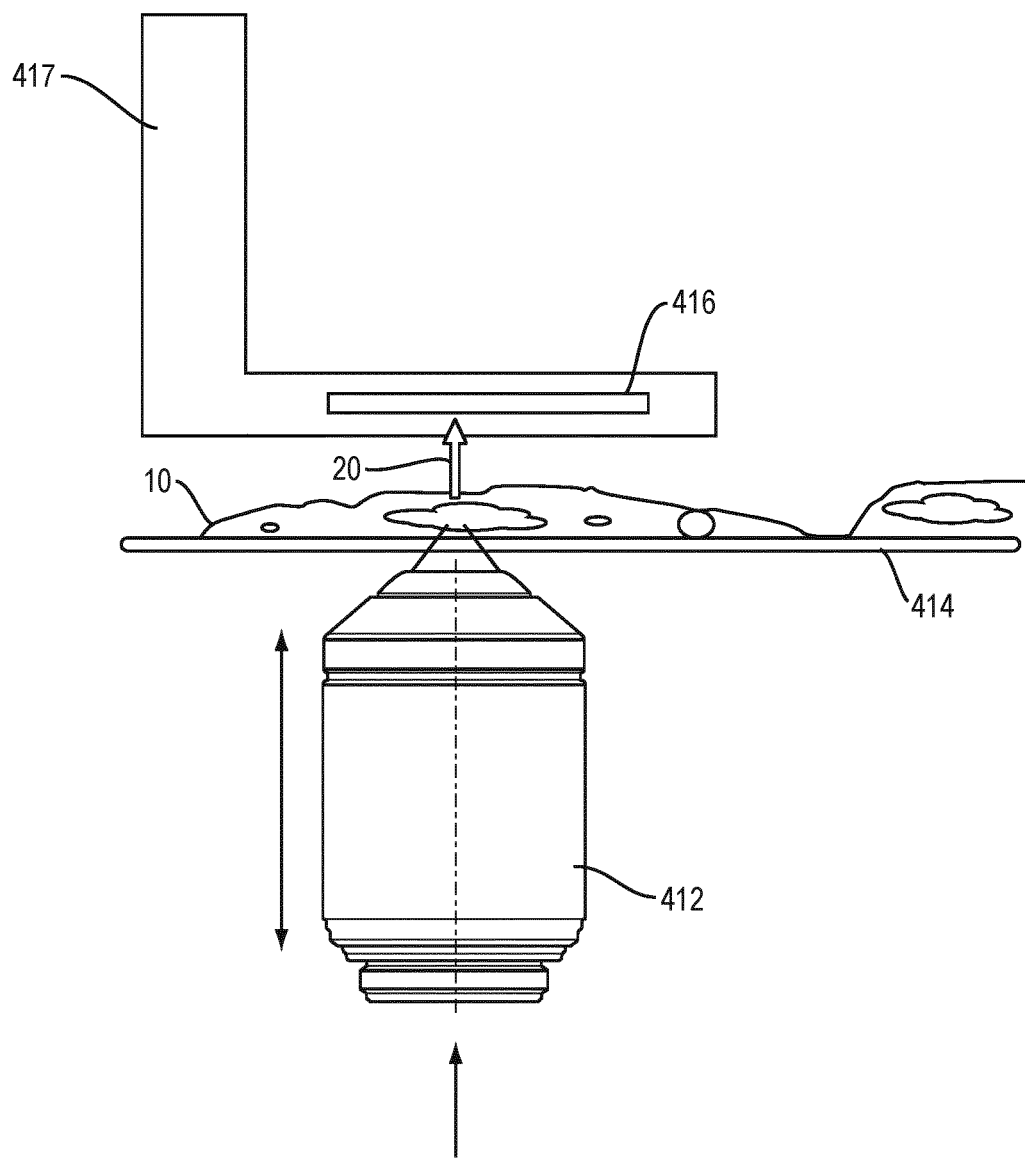
FIG. 5 illustrates an example of a receiver that includes a spatially-differentiated medium such as a microwell plate.

FIG. 5 illustrates an example of a receiver 416 that includes a spatially-differentiated medium, such as a microwell plate, microwell chip, nanodroplet array, or other structure capable of receiving individual ablated subsamples and maintaining the separate subsamples in different, spatially separated compartments. The receiver 416 may be attached to a receiver stage 417 capable of being selectively moved in at least two axial directions, more preferably in all three axial directions.

As described in relation to other embodiments above, the optical assembly 412 is configured to provide imaging and/or ablation of a sample 10 placed upon the sample stage 414. During ablation, the resulting ablation plume 20 extends upward toward the receiver 416 where it is collected and spatially differentiated from other ablated subsamples. When a desired number of subsamples have been collected, or when the receiver 416 is full, it may be removed from the receiver stage 417 and passed to an analyzer for further processing and/or analysis of the collected subsamples.

Figure 6A:
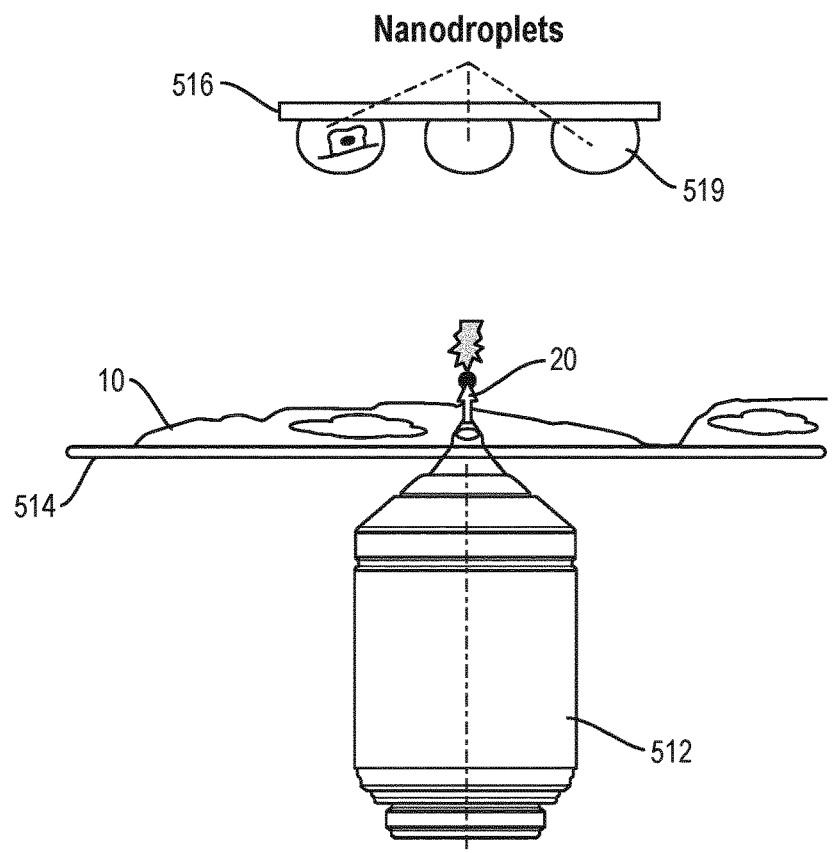
FIG. 6A illustrates an example of a receiver that includes a nanodrop array.

FIG. 6A illustrates a particular embodiment where the receiver 516 is configured as a nanodroplet array. As with other embodiments, the optical assembly 512 is configured to provide imaging and/or ablation of a sample 10 placed upon the sample stage 514. During ablation, the resulting ablation plume 20 extends upward toward the receiver 516 where it may be collected into a corresponding nanodroplet 519 or a series of such nanodroplets 519. The separate nanodroplets 519 thus form separate compartments that function to spatially separate the different ablation subsamples from separate ablation events. As above, when a desired number of subsamples have been collected, or when the receiver 516 is full, it may be removed from the receiver stage and passed to an analyzer for further processing and/or analysis of the collected subsamples.

Figure 6B:
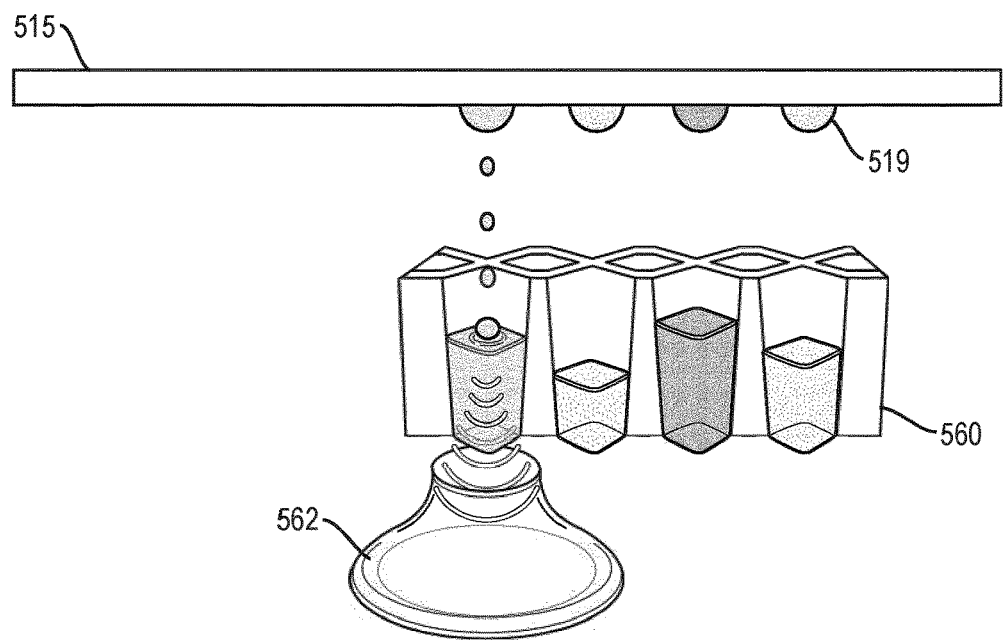
FIG. 6B illustrates an example process for forming a nanodrop array.

FIG. 6B illustrates an exemplary process for forming a nanodroplet array such as included in receiver 516. An acoustic transducer 562 may be utilized to apply acoustic energy to separate barcode solutions in a barcode array 560. The resulting nanodroplets are transmitted from the barcode array 560 to an overlying slide 515. The nanodroplets 519 may include different barcodes and therefore be ready for subsequent analysis of the ablated subsamples captured by the nanodroplets, such as subsequent PCR or sequencing of captured nucleic acid. The barcodes may be correlated to the spatial position of the nanodroplets 519 on the slide 515.

Figure 7:
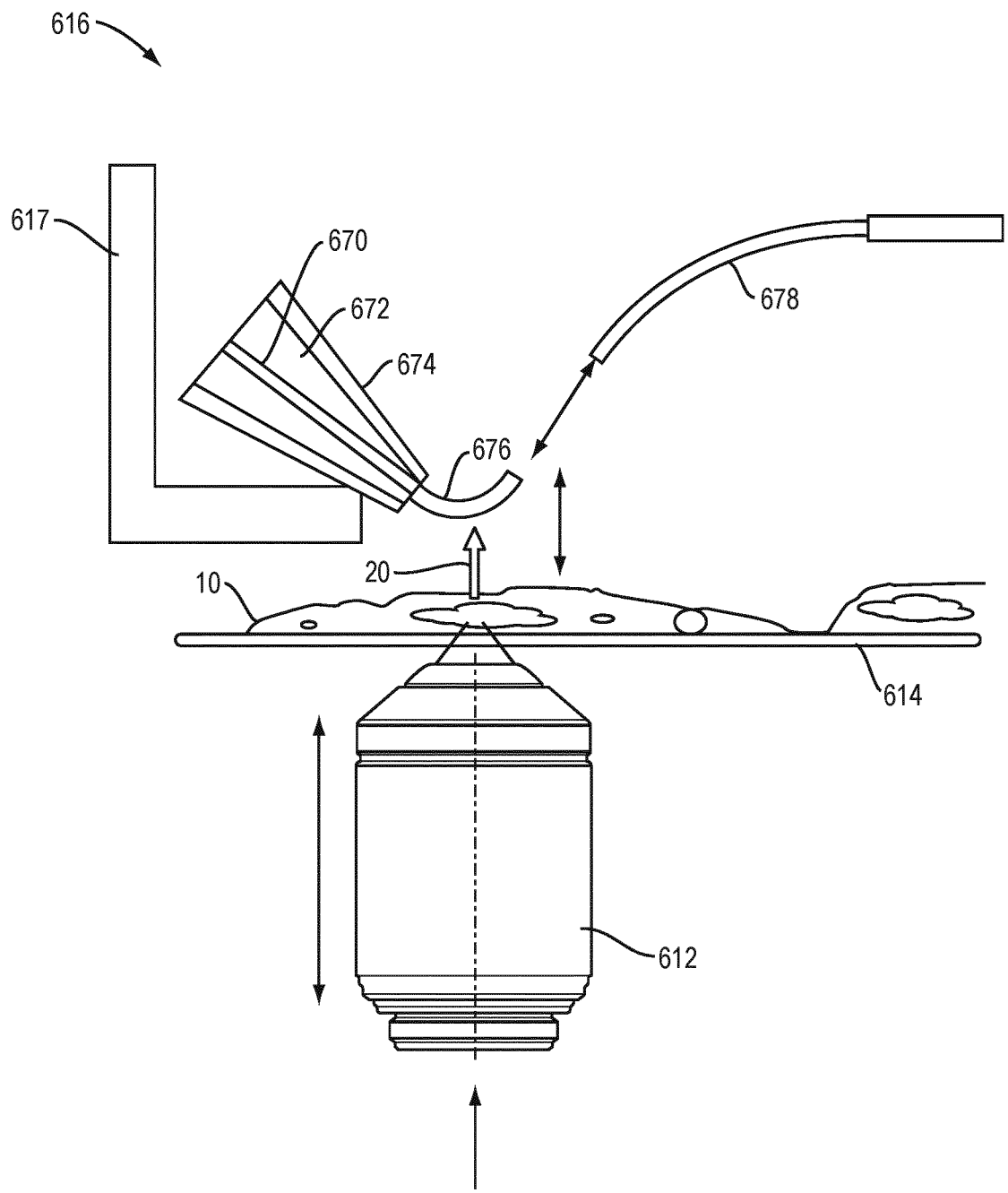
FIG. 7 illustrates an embodiment of a receiver that includes an electrospray probe and is configured for generating ionized droplets containing ablated subsamples for transmission to an inlet of a mass spectrometer.

FIG. 7 illustrates an embodiment of a receiver 616 that includes an electrospray probe 670. This type of receiver may be particularly useful for generating ionized droplets containing ablated subsamples for analysis via mass spectrometry. The electrospray probe 670 passes through a capillary 674. An exposed distal portion 676 of the probe 670 extends beyond the distal end of the capillary 674. A solvent 672 is disposed within the capillary 674 and flows out to wet the surface of the exposed distal portion 676. The capillary 674 is configured apply the solvent 672 such that the solvent 672 flows along an outer surface of the exposed distal portion 676 toward the tip of the electrospray probe 670. The tip of the electrospray probe 670 forms electrospray droplets and directs them toward a mass spectrometer inlet 678. The solvent may include, for example, water and/or one or more volatile organic compounds such as methanol, acetonitrile, acetic acid, and the like.

As shown, the wetted surface of the exposed distal portion 676 may be positioned above the ablation plume 20 so that the ablated subsample is collected on the wetted surface during ablation of the sample 10 using optical assembly 612. The positioning systems of the sample stage 614 and receiver stage 617 may be coordinated to align the ablation plume 20 with the exposed distal portion 676. The flow rate of the solvent 672 may be controlled according to ablation frequency to ensure effective spatial separation of successive subsamples captured by the flowing solvent 672 on the wetted surface of the exposed distal portion 676.

In contrast to conventional LAESI systems, which ionize a relatively small fraction of the ablated material, the illustrated configuration has been found to be capable of ionizing the ablated material with an efficiency of about 20% or more, about 35% or more, about 50% or more, about 65% or more, about 80% or more, about 90% or more, about 95% or more, or about 99% or more.

Ablated Sample Analyzer

As discussed above, a downstream analyzer may be utilized to further process and/or analyze the ablated subsamples collected by the receiver. Depending on the type of processing and/or analysis desired, the downstream analyzer may include one or more, for example, PCR machines, sequencing machines, optical spectrometers, nuclear magnetic resonance (NMR) spectrometers, mass spectrometers, chromatography devices, centrifuges, electrophoresis devices, radiolabeling and radiolabel detection devices, other analytical biochemistry devices, or combinations thereof.

Where a mass spectrometer is included, the analyzer may include one or more of, for example, a time of flight (TOF) mass spectrometer, an orbitrap mass spectrometer, a linear ion trap mass spectrometer, a quadrupole mass spectrometer, a quadrupole ion trap mass spectrometer, a magnetic sector mass spectrometer, or a Fourier transform ion cyclotron resonance (FTICR) mass spectrometer.

Where a sequencing is utilized, the sequencing machine may be configured to perform next generation sequencing (NGS), also sometimes referred to as a high-throughput sequencing. Suitable sequencing modalities include 454 pyrosequencing, ion torrent sequencing, nanopore sequencing, synthesis sequencing (i.e., Illumina sequencing) and/or other sequencing methods that are known or will be developed in the art. More traditional chain termination methods (e.g., Sanger sequencing) may also be utilized.

Figure 8:
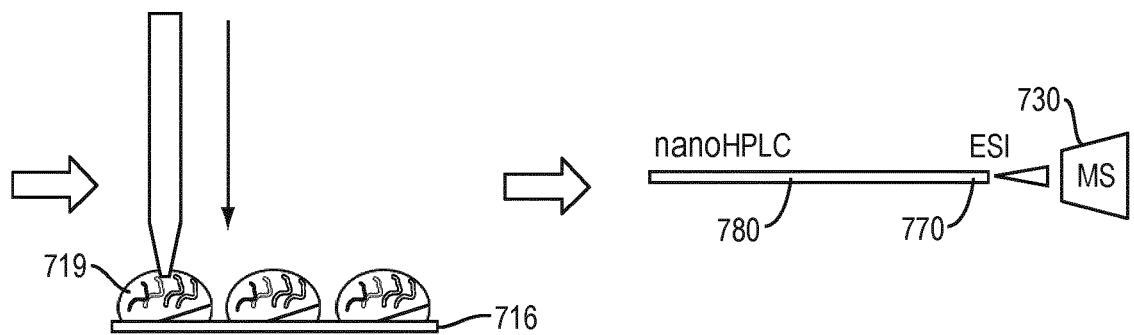
FIG. 8 illustrates one example of a downstream process where one or more reagents may be added to spatially separated compartments of a receiver and/or that one or more subsamples may be passed to a liquid chromatography column that is coupled to an electrospray probe for passing ionized samples to a mass spectrometer.

FIG. 8 illustrates one example of a downstream process where one or more reagents may be added to the spatially separated compartments (nanodroplets 719 in this example) of the receiver 716. One or more reagents may be added to perform, for example, cell lysis, protein extraction, reduction, alkylation, digestion, and/or other desired reactions for preparing the collected subsamples.

FIG. 8 also illustrates that subsamples may additionally or alternatively be transferred to a liquid chromatography mass spectrometry (LC MS) system. For example, subsamples may be passed to a liquid chromatography column 780 that is coupled to an electrospray probe 770 for passing ionized samples to a mass spectrometer 730.

Operation Modes

Figure 9:
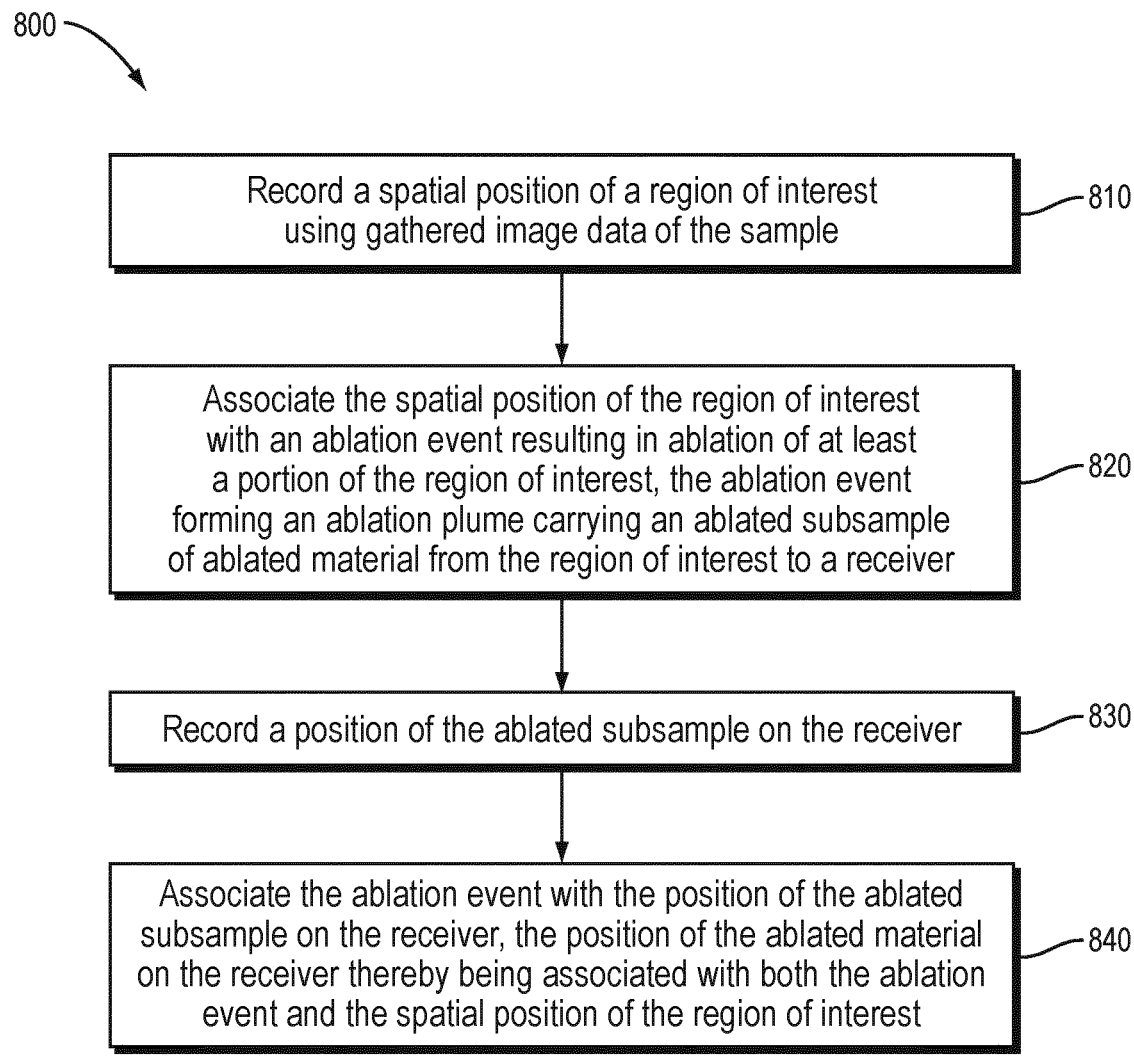
FIG. 9 illustrates an exemplary method for correlating the position of an ablated subsample on a receiver to an ablation event and to a targeted region of interest on the sample slide.

The devices and system described herein may be configured to perform various imaging and/or ablation processes. FIG. 9 illustrates an exemplary method 800 for correlating the position of an ablated subsample on a receiver to an ablation event and to a targeted region of interest on the sample slide. As described above, the region of interest on the sample slide may be further correlated to upstream sorting/flow data (see, e.g., FIG. 3 and associated description). The method 800 may be performed using a controller communicatively coupled to certain components of the system, such as the controller 140 described above in relation to system 100.

In the illustrated method, the controller may first record a spatial position of a region of interest using gathered image data of the sample (step 810). The imaging may be done using one or more of brightfield imaging, sectioning, epifluorescence imaging, and/or two-photon imaging, for example. Further, the imaging may be accomplished using the same objective through which ablation laser pulses are subsequently passed for ablating the targeted region of interest.

The controller may then associate the spatial position of the region of interest with an ablation event resulting in ablation of at least a portion of the region of interest, the ablation event forming an ablation plume carrying an ablated subsample of ablated material from the region of interest to a receiver (step 820). This step may therefore associate the temporal information of the ablation event to the spatial position of the region of interest on the sample slide.

The controller may then record a position of the ablated subsample on the receiver (step 830), and then associate the ablation event with the position of the ablated subsample on the receiver, the position of the ablated subsample on the receiver thereby being associated with both the ablation event and the spatial position of the region of interest (step 840). These steps may therefore enable the spatial position of the ablated subsample on the receiver to be associated with the corresponding temporal information of the ablation event and to the spatial position of the region of interest on the sample slide. The set of correlations thus allows for subsequent tracing of subsample data back to the corresponding temporal events and spatial positions that led to the subsample data.

During ablation, the laser pulse frequency, laser pulse energy level, and laser pulse depth may be independently varied to provide desired operational capabilities. In a standard implementation, for example, a single pulse may be directed at a fixed focus position. The pulse energy may be selected so as to optimize ablation, optimize plume formation, and/or minimize degradation of the transferred subsample.

Figure 10:
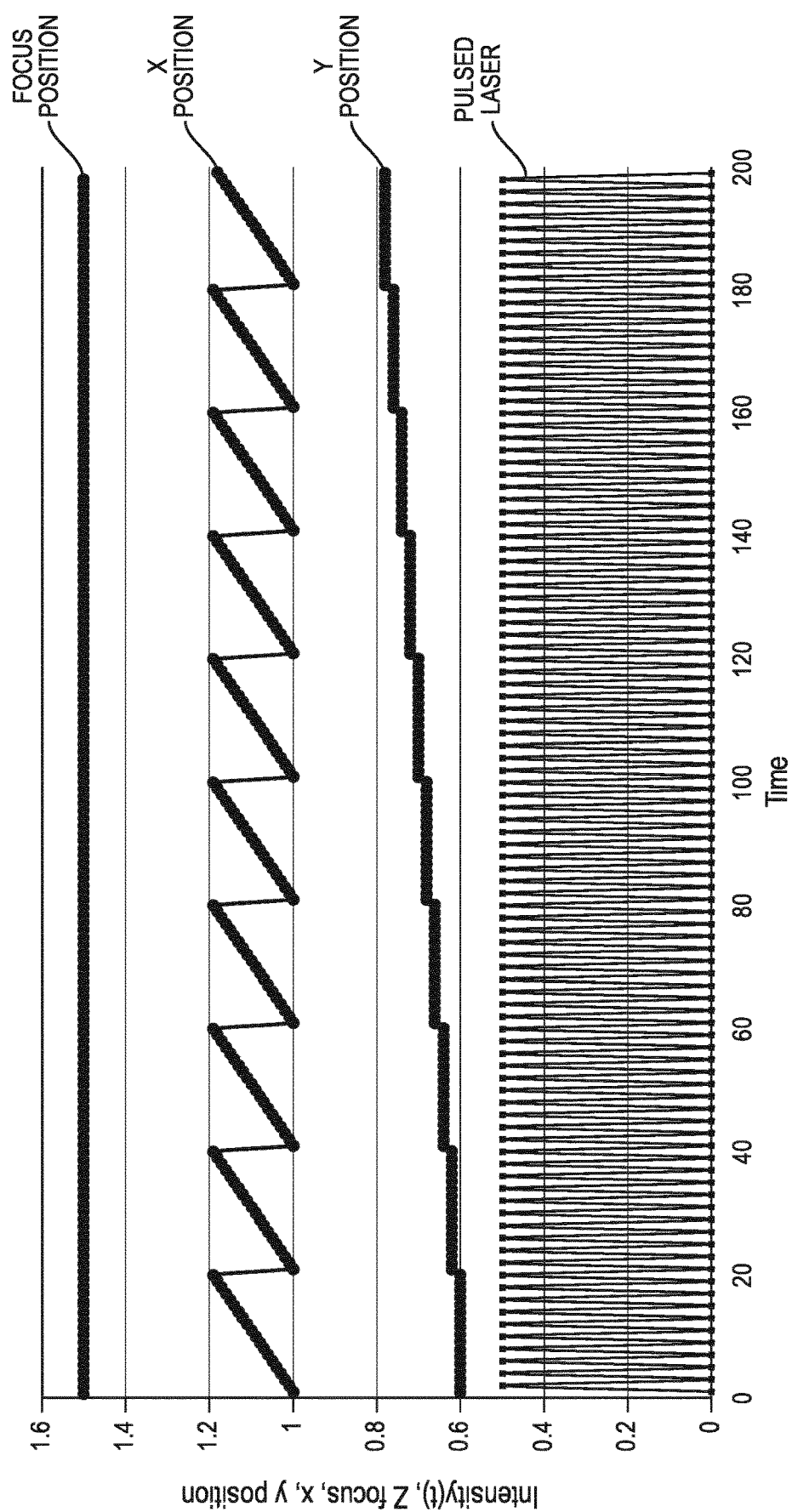
FIG. 10 graphically illustrates an example imaging/ablating device operation mode in which a rectangular xy area of a sample is scanned and ablated.

In other implementations, the depth of the applied laser pulse and/or the pulse energy level may be dynamically varied to provide desired effects. FIG. 10 graphically illustrates an example operation mode in which a rectangular xy area is scanned and ablated. The laser pulse frequency may be tuned to balance dwell time and pulse to pulse overlap. This type of implementation may be utilized to ablate entire structures (e.g., various organelles within a cell), or desired portions thereof, in a spatially coordinated manner. Note that the units along the axes of the graph are for illustrative purposes only, and are not necessarily to definite scales.

Figure 11:
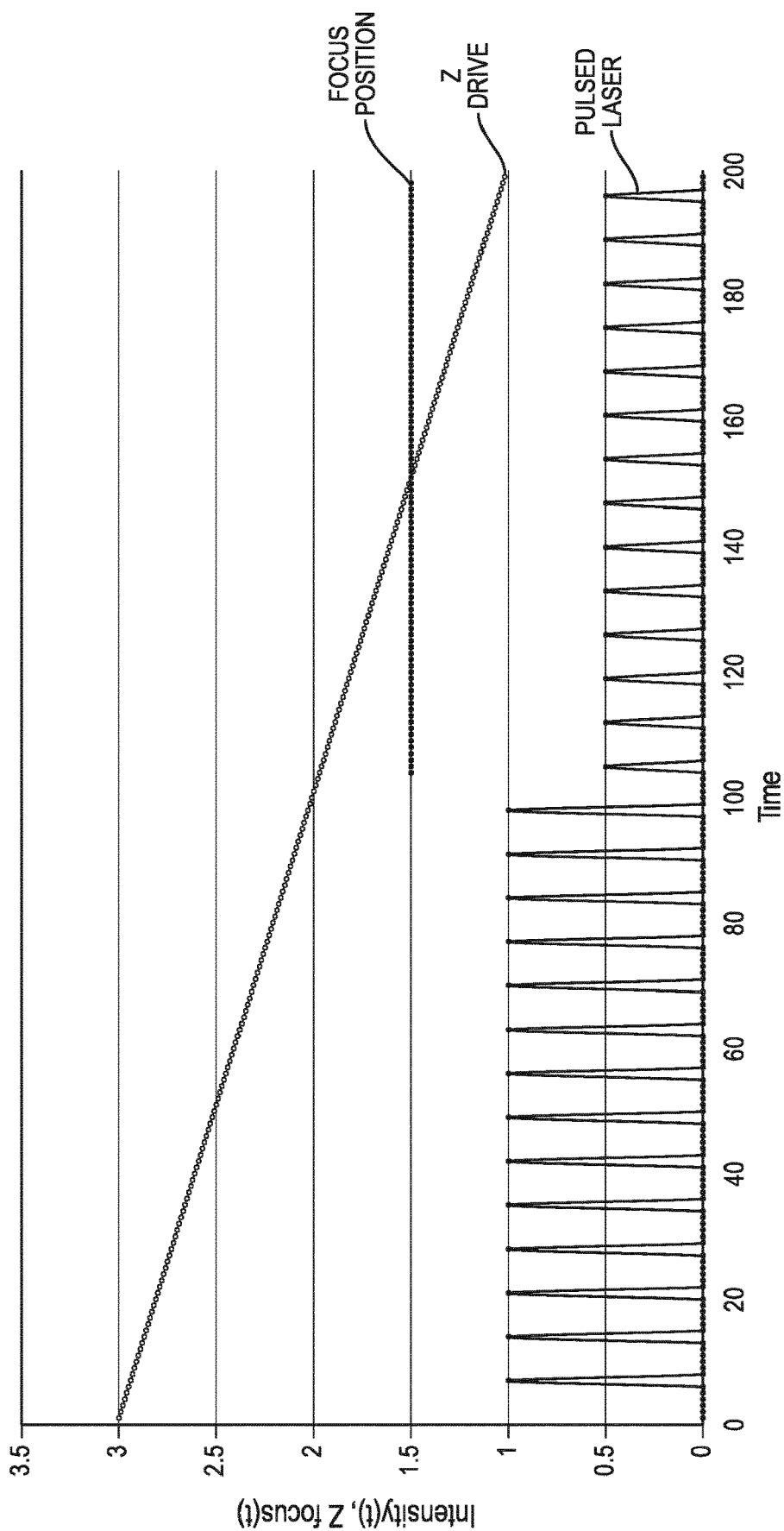
FIG. 11 graphically illustrates an example of an imaging/ablating device operation mode that may be utilized to remove a layer of tissue, media, or other obstructing material overlying the targeted region of interest by dynamically adjusting the position of the applied laser pulses and the pulse energy level.

FIG. 11 graphically illustrates another example of an operation mode that may be utilized where there is a layer of tissue, media, or other obstructing material overlying the targeted region of interest. The "z drive" line indicates movement of the applied laser pulses along an axial/vertical channel (i.e., along the z axis). The "focus position" line indicates the depth at which the targeted zone of interest resides. As shown, the upper layers initially undergo higher energy laser pulses that may be better tailored for removing the overlying material and opening up an axial channel. Once the dynamically moving laser pulses reach the depth of the region of interest, the laser pulse energy level may be decreased to a level more suited to ablation of the region of interest. The ablated material may then travel away from the sample and toward the receiver before the formed channel collapses back over the region of interest. Note that the units along the axes of the graph are for illustrative purposes only, and are not necessarily to definite scales.

An operation mode such as shown in FIG. 11 can beneficially allow for ablation of targeted regions that reside somewhat deeper within the sample as measured from the upper surface. For example, without first removing some of the overlying material, ablation may in some circumstances be limited to the upper 2 to 10 μm of the sample due to the need to transport the resulting plume upward to the receiver through any remaining overlying material. Dynamically configuring the operation mode such as in FIG. 11 can remove or lessen the amount of overlying tissue and therefore allow an ablation plume from a deeper region of interest to effectively transport to the receiver.

Imaging and ablating devices as described herein may also be operated to focus the ablation laser at a depth from the upper surface of the sample that is associated with the spatial resolution value (i.e., the shortest distance between two points on a specimen that can still be distinguished). That is, when the required spatial resolution value is relatively small, the maximum depth at which the ablation laser is focused is also smaller, and when the spatial resolution value required and/or utilized is greater, the maximum depth at which the ablation laser is focused is also greater. This approach allows for greater focus depths where the required spatial resolution value to effectively target the region of interest is sufficiently large, but limits the focus depths where the required spatial resolution value is small, thereby increasing the likelihood that the resulting ablation plume will be capable of successfully transporting from the sample to the receiver.

For example, the ablation laser may be focused at a depth, measured from the upper surface of the sample, that is no more than R times the spatial resolution, where R is a value of about 5 to about 30, such as a value of about 10, 15, 20, or 25. It will be understood, however, that depths greater than those dictated by the value of R may be ablated in at least some applications, such as where dynamic laser operation is utilized as with the operation illustrated by FIG. 11.

At least a portion of the sample disposed between the bottom surface of the sample and the point of laser focus may remain un-ablated. Thus, particular sub-sample volumes at particular depths may be targeted for ablation in a manner that allows successful transport of the resulting ablation plume to the receiver.

Computer/Controller Systems

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

As used herein, the term "ablation" refers to selective application of energy to a targeted region in order to free biomolecules within the targeted region from surrounding structures. The ablated materials will typically form a "plume" of material that travels away from the initial position of the targeted region.

The term "region of interest," as used herein, is intended to be understood as any region within a field of view of an imaging/ablating device where one or more biomolecules reside that are desired to be collected, processed, and/or analyzed. The region of interest may include the entire field of view, but more typically will be a portion of the field of view and may be, for example, a cell or collection of cells, an intra/sub-cellular region such as an organelle within a cell, or an extracellular region.

The term "subsample" as used herein, is intended to refer to the individual portions of ablated material that are spatially and/or temporally separate from one another, such as by being spatially separated from one another on the receiver and/or by being received by the receiver at different times from different ablation events. The term subsample is therefore intended to distinguish the separate portions of collected ablated material from the larger, overall "sample" which is positioned on the slide/stage that may be imaged and selectively ablated.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention.

Conclusion

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended claims. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the claims and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure.

All changes which come within the meaning and range of equivalency of the claims are to be embraced within their scope.

What is claimed is:

1. A device for imaging and ablating a sample in a manner that allows for analysis of an ablated portion of the sample, the device comprising:
    a sample stage having a first side configured for placement of a sample thereon and a second side disposed opposite the first side;
    an optical assembly including an objective, the objective being disposed on the second side of the sample stage and being configured to enable microscopic imaging of the sample placed on the sample stage, the optical assembly also including a laser,
    wherein the laser is disposed on the second side of the sample stage, the laser being configured to direct laser light through the objective, through the sample stage and into the sample to selectively ablate at least a portion of the sample; and
    a receiver disposed on the first side of the sample stage, the receiver being configured to receive ablated material ejected from the sample to enable further analysis of the ablated material, wherein the device is configured to dynamically vary at least one of laser pulse frequency, laser pulse energy level and laser pulse depth during ablation.

2. The device of claim 1, wherein the laser light is oriented so that the laser light substantially propagates in the intended direction of movement of an ablation plume resulting from ablation of the sample.

3. The device of claim 1, wherein the first side of the sample stage is an upper side and the second side of the sample stage is a lower side such that the objective is disposed below the sample stage in an inverted position.

4. The device of claim 1, wherein the optical assembly is configured to enable epifluorescence imaging and/or brightfield imaging and/or sectioning.

5. The device of claim 1, wherein the laser is a near infrared femtosecond laser.

6. The device of claim 1, wherein the laser is configured to enable two photon imaging using the objective.

7. The device of claim 1, wherein the laser is configured to deliver pulse energies of about 1 nJ to about 10 μJ per μm$^3$ of sample.

8. The device of claim 1, wherein the objective has a numerical aperture (NA) of about 0.5 or more.

9. The device of claim 1, wherein the optical assembly is configured to enable ablation of a targeted region having a diameter of about 50 μm or less.

10. The device of claim 1, wherein the optical assembly is configured to enable ablation of a targeted region having a volume of about 500 μm$^3$ or less.

11. The device of claim 1, wherein the optical assembly is configured to enable ablation of whole cells, or one or more targeted organelles within a cell.

12. The device of claim 1, wherein the sample stage is selectively moveable in at least 2 axial directions.

13. The device of claim 1, wherein the receiver is coupled to a receiver stage, and wherein the receiver stage is configured to be selectively moveable in at least 2 axial directions.

14. The device of claim 1, further comprising an incubation container configured in size and shape to be disposed between the sample stage and the receiver and configured to provide an incubation environment for a sample placed upon the sample stage.

15. The device of claim 1, wherein the receiver is spaced from the sample stage by about 1 mm or less.

16. The device of claim 1, wherein the receiver comprises a medium configured for non-overlapping, spatial differentiation of individual subsamples of ablated material.

17. The device of claim 1, wherein the receiver comprises a microwell plate configured to enable polymerase chain reaction (PCR) of nucleic acid within the ablated material received by the microwell plate, preferably to enable sequencing of nucleic acid within the ablated material received by the microwell plate.

18. The device of claim 1, wherein the receiver comprises a nanodroplet array.

19. The device of claim 1, wherein the receiver comprises a surface wetted with a solvent.

20. The device of claim 1, wherein a portion of the receiver that initially receives an ablation plume is spaced from an upper surface of the sample a distance of about 700 times a height of an ablated portion of the sample.

21. A system for ablating and analyzing a targeted region of a sample, the system comprising:
    the imaging and ablating device as in claim 1; and
    an analyzer configured to receive and analyze at least a portion of the ablated material received by the receiver.

22. A method of imaging and ablating a sample to enable analysis of an ablated portion of the sample, the method comprising:
    providing an imaging and ablating device as in claim 1;
    acquiring an image of the sample;
    selecting a region of interest within the sample;
    delivering laser light to the region of interest to ablate at least a portion of the region of interest; and
    capturing at least a portion of the ablated material on the receiver;
    wherein multiple laser pulses are applied to the sample and wherein one or more of laser pulse frequency, laser pulse energy level, or laser pulse depth are dynamically varied across the multiple laser pulses.

* * * * *